United States Patent [19]

Maltese

[11] 4,087,312

[45] May 2, 1978

[54] FEEDING-APPLYING LETTERING TAPE

[76] Inventor: Peter C. Maltese, 156 Paree Dr., Pittsburgh, Pa. 15239

[21] Appl. No.: 820,909

[22] Filed: Aug. 1, 1977

[51] Int. Cl.$^2$ .......................... B32B 31/04; B31F 5/00

[52] U.S. Cl. ...................................... 156/552; 156/554

[58] Field of Search ............... 156/554, 555, 552, 302, 156/303

[56] References Cited

U.S. PATENT DOCUMENTS 3,623,933 11/1977 Staats .................................. 156/555

*Primary Examiner*—Douglas J. Drummond

*Attorney, Agent, or Firm*—Parmelee, Miller, Welsh & Kratz

[57] ABSTRACT

An adjustable and adaptable device or apparatus has been provided for effecting an automatic application and feed of a pressure-sensitive side of a reel of tape and particularly, of tape having lettering such as advertising lettering on its outer side. The apparatus is constructed for use with a conventional belt conveyor on which a glass, resin or plastic, planar-like display panel or sheet length is adapted to be advanced. Means is provided for slidably mounting the apparatus outwardly of the conveyor for longitudinal adjustment thereon. The apparatus has stands that carry a cross-extending, primary, reel-supporting shaft and a cross-extending applicator-arm-mounting secondary shaft in such a manner that one or a group of reel-mounted tapes may be fed, maintained in an aligned relation, and progressively applied to the outer face of an advancing panel. An applicator arm accurately applies a pressure-sensitive adhesive side of tape to an exact position on the panel during its advancing movement, maintains such alignment while applying a minimum requisite amount of pressure to the outer side of the tape to cause it to adhere thereto, and during advancing movement of the panel also provides a corresponding advance and unreeling of the tape until a desired length has been mounted on the panel. A production run of sign panels may be produced with each setting of the apparatus, and it may be then readjusted to a different setting to meet the requirements of a different type of lettering, spacing of lines, etc.

15 Claims, 4 Drawing Figures

FEEDING-APPLYING LETTERING TAPE

BACKGROUND OF THE INVENTION

1. Field of the Invention

This invention relates to a semi-portable, substantially fully adjustable apparatus or device for accurately and automatically applying pressure-sensitive tape from a feed reel along the length portion of an advancing sign panel or the like. A phase of the invention deals with an apparatus for feeding and applying lettered tape to a planar panel-like member to progressively advance a tape length in a desired aligned relation along the outer face of the member during its application thereto.

2. Description of the Prior Art

Heretofore, it has been customary to manually apply sign-tape or lettering to panels for display sign or message usage. This has been a rather slow and tedious operation and highly expensive equipment is not warranted. Also, where more than one line of lettering is desired on a panel, it has been customary to repeat the operation by measuring the desired spacing between one lettering tape and another and applying each tape successively in a parallel, transversely spaced relation on the panel. This is an expensive operation even when only one sign panel is being made, but it frequently occurs that the customer requires a number of panels of the same configuration or lettering for mounting at different locations in connection with the sale of its products. Thus, the hand operation not only is an exacting and tiring one to the operator, but also requires skill and care that cannot be relaxed.

It is recognized that devices or machines have heretofore been constructed for applying flexible, so-called hinge tape to cards and signs, for applying reinforcing and sealing tapes to packages and containers, such as those of cardboard, and for binding parts of boxes or shipping containers. It is also understood that a machine has also been developed for smoothing-out previously applied tapes. However, there has been a need for a device to meet the problem above outlined, to enage minimization of manual skill and concentration in applying sign tape to panels, and to enable a more accurate and speedy type of operation. Further, there is a need for a device that will be relatively simple in its construction but, at the same time, that can be quickly adapted to meet various applicating requirements, that is portable and can be used with a conventional panel conveying table without the need for independent feed or advancing means.

SUMMARY OF THE INVENTION

It has thus been an object of the invention to devise a mechanical apparatus or device for meeting the problem above-outlined.

Another object has been to devise a simple, adjustable and easily adapted device for automatically applying and enabling a progressive advancing movement of one or more pressure-sensitive tapes is smoothly applied alignment along the face of a sign panel.

A further object of the invention has been to provide an applicator pressure-sensitive tape apparatus that will utilize the feeding movement of a sign panel for progressively applying pressure-sensitive tape thereto, and with a force that is suitable for both applying the tape and causing it to advance with the panel.

These and other objects of the invention will appear to those skilled in the art from the illustrated embodiment and the claims.

BRIEF DESCRIPTION OF THE DRAWINGS

In the drawings,

FIG. 3 is a fragmental isometric forward end view in elevation of the apparatus of FIG. 1, illustrating details of its construction and on a slightly enlarged scale with respect to FIG. 2; and FIG. 4 is a perspective fragmental, isometric elevation showing an applicator arm of the construction and on a slightly enlarged scale with respect to FIG. 3.

DESCRIPTION OF THE PREFERRED EMBODIMENT

Figure 1:
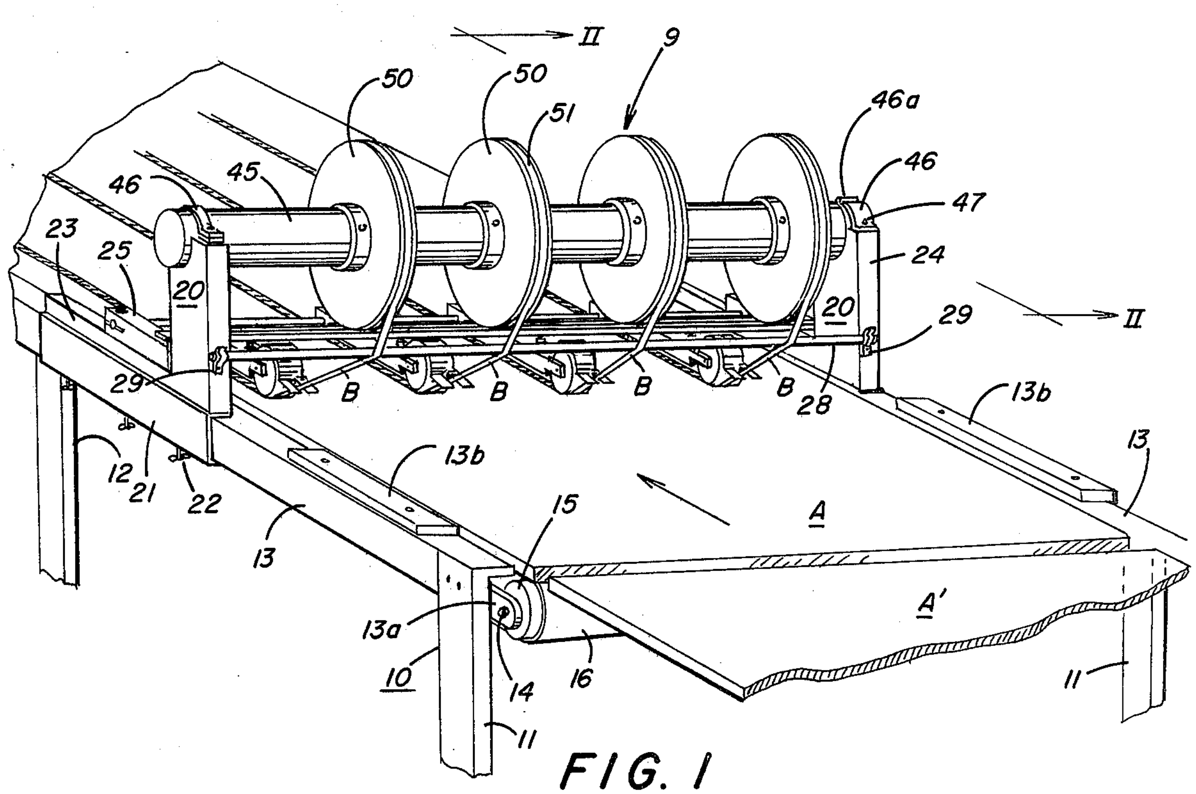
FIG. 1 is a fragmental isometric view in side elevation showing a device or apparatus of the invention removably mounted in an operating position on a conveyor that is employed to advance a sign panel.
Figure 2:
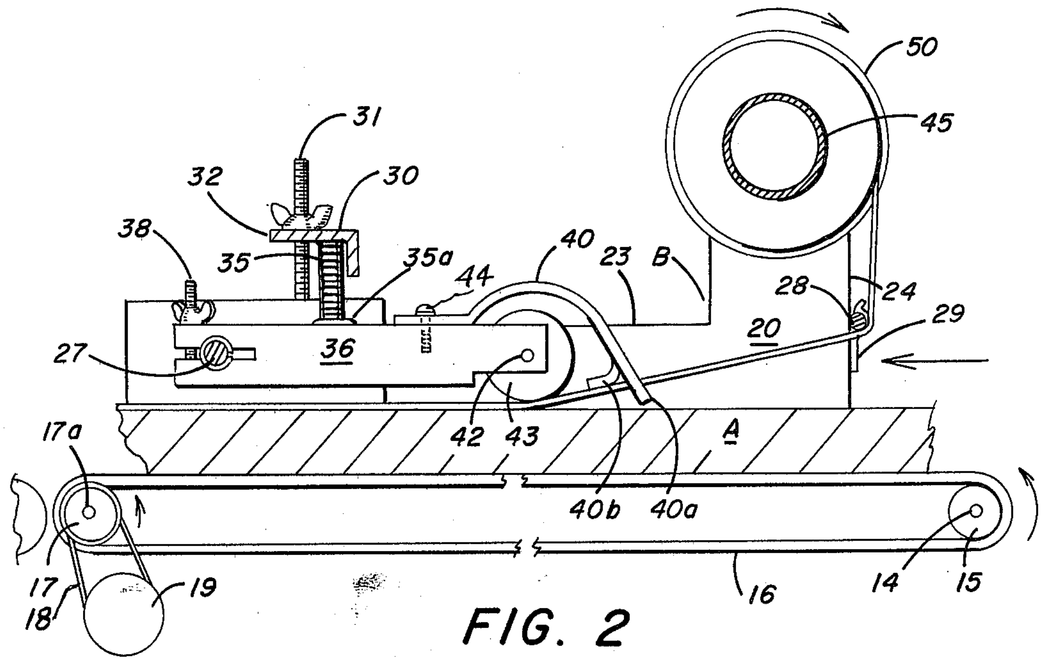
FIG. 2 is an enlarged fragmental side section in elevation showing details of the apparatus in its applicating operation; this view is taken along line II—II of FIG. 1.
Figure 1:
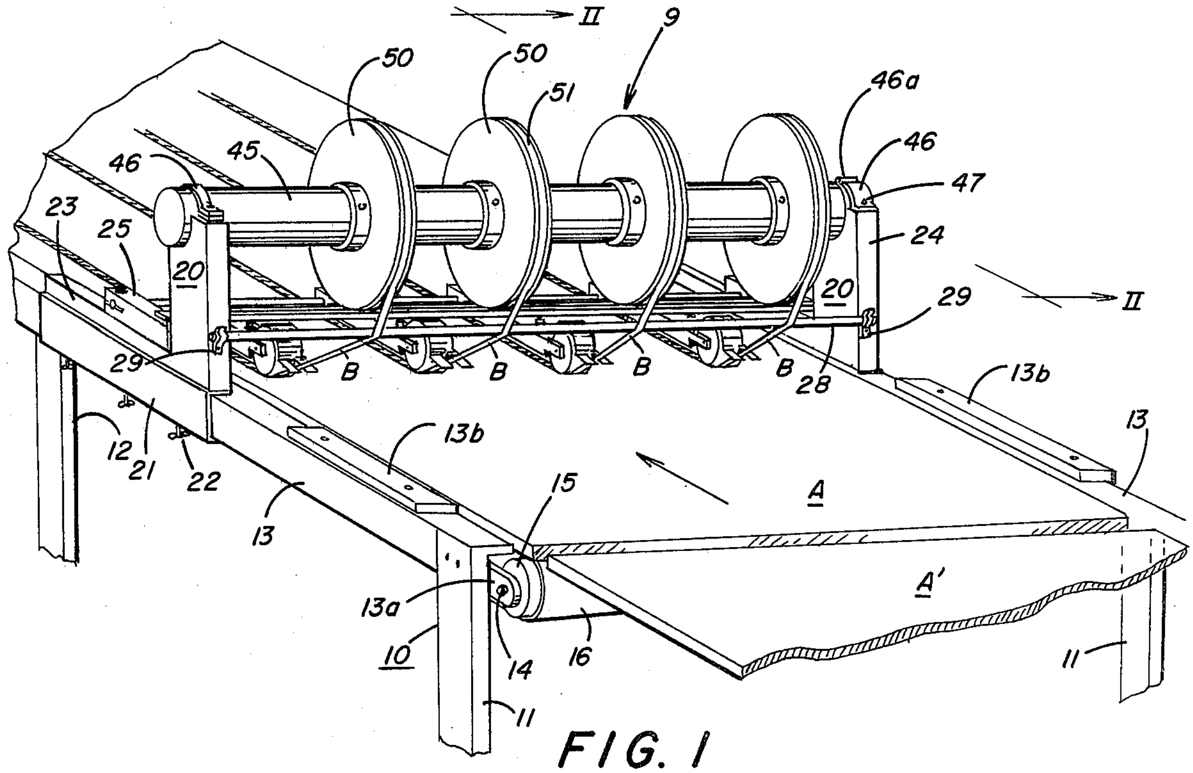
Figure 2:
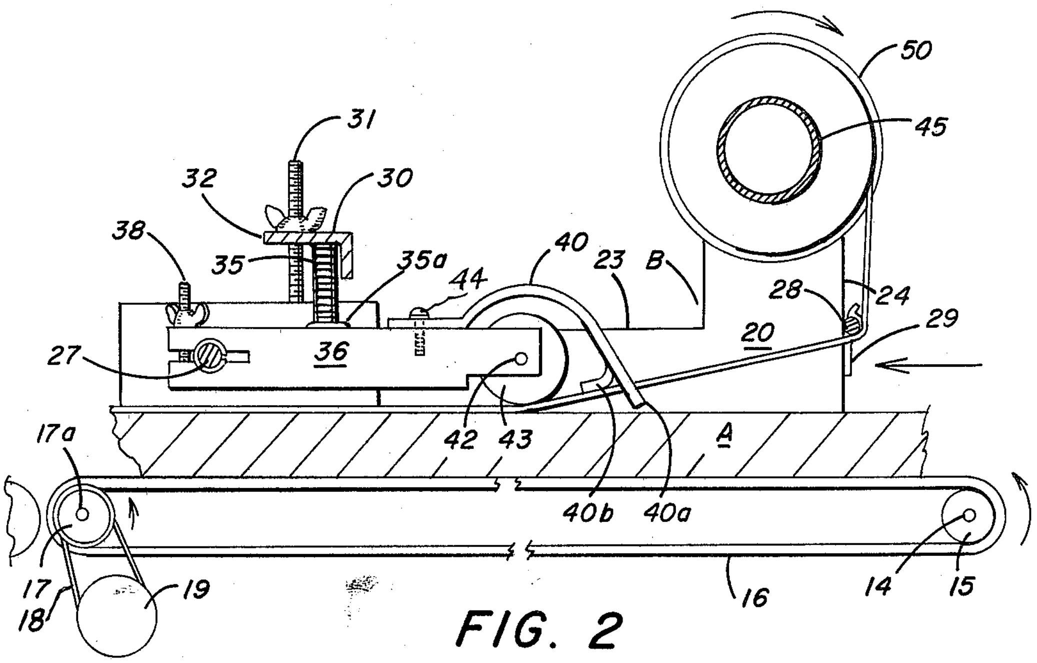

Referring particularly to FIGS. 1 and 2, a conveyor support frame or table 10 is positioned in a horizontally elevated relation on front and back pairs 11 and an intermediate pair 12 of upright legs. The table 10 also has a pair of longitudinally extending, opposed side rails 13 in a transversely spaced relation therealong to define a longitudinal open central area along which a continuous conveyor belt 16 of canvas or other suitable material is adapted to move, as indicated by the arrows of FIGS. 1 and 2. The front end of the belt 16 leaves over an idler roller 15 whose shaft 14 is rotatably carried within a pair of mounting lugs **13*a* that extend forwardly from the side rails 13. A pair of side-positioned guide bars 13*b* are shown removably mounted on associated rails 13, as by set screws (see FIG. 1), to serve as side edge guides for a panel A during its forward movement on the belt 16**.

As indicated in FIG. 2, the belt 16 may be actuated by a back roller 17 that is driven by an electric motor 19 and a suitable speed reducing drive which includes a belt 18. The roll 17 may be mounted for rotation between back end portions of the side rails 13 on a cross-extending shaft **17*a***.

Again referring to FIG. 1, a planar-like panel of resin, glass or other suitable (preferably transparent) material A is shown advanced forwardly (as indicated by the arrow) on the belt 16 while tapes B are being simultaneously applied to its upper or outer face in an advancing relation therealong. The panel A may be of any desired length and if, as usual, there are a number of signs of the same type to be produced, then a second panel, indicated as A′, may be advanced in progression onto the belt 16 for application of the same type of lettering with the same transverse spacing, etc., as represented by a predetermined setting of the apparatus. Thus, a number of sheets may be successively advanced and accurately taped without changing the adjustment of the device.

It has been determined that it is important to provide means for adjusting the pressure of tape application to the panels A or A′ with sufficient pressure to effect adhesion of its pressure-sensitive under side thereto, but without in any way causing the tape to distort, misalign or stretch from its natural shape as supplied from a tape-wound feed reel, such as 50. In this connection, an individual applicator arm 36 is provided for each tape reel 50. Such arm is transversely adjustably, swingably or pivotally mounted on a secondary cross-extending shaft 27 in a spring-loaded manner.

As particularly illustrated in FIGS. 2 and 3, the device of the invention has a pair of opposite side stand means or uprights 20, each of which has a primary stand or pillar 24 for carrying a cross-extending, primary, reel-mounting shaft 45, and a secondary stand or pillar 25 for carrying the secondary shaft 27. Each secondary stand 25 is shown birfurcated or split to facilitate mounting the secondary shaft 27. An outwardly or upwardly extending threaded thumb screw or bolt 26 at its inner end, is adapted to engage the top flange of an upper channel 23 to lock the associated stand in a desired longitudinally slidably adjusted position thereon. The screen or bolt 26 extends across the lips of a bifurcated portion of each stand 25 to cooperate with an associated thumb nut **26*a* for clamping end portions of the shaft 27** in position.

It will be noted (see FIG. 4) that each applicator arm 36 has a slit or bifurcated back end portion **36*a* through which a threaded stem 38 extends and cooperates with a thumb nut 38*a* to enable slidable adjustment of each arm 36 along the shaft 27. A split bearing 37 enables each applicator arm 36 to be swingably or pivotally mounted at a particular selected, transverse positioning on the secondary shaft or rod 27 in alignment with an associated feed or feeder reel 50** and its tape length B.

Also, as shown, each applicator arm has a spirally convoluted tension spring 35 which at one end is adapted to rest in a groove or channel defined between a back flange portion of a cross-extending member or bar 30 and a front, full length rib 32 that extends along its opposed edge. The member 30 is positioned between the shafts 27 and 45 to serve as a spring-load adjusting means. Each spring 35 is slidable along the channel with its applicator arm 36 and, at its lower end, is securely mounted on its associated arm by a ring-like collar **35*a*. The front end of each applicator arm 36 is provided with a fender-like member, guide strap or element 40 that is upset at its forwardly extending end to provide a centrally disposed, backwardly declining, central guide lug or lip 40*b* for movement of the tape therealong (see FIGS. 2 and 4), and a guide slot or groove, as defined by spaced-apart bifurcations or side-positioned fingers 40*a*. In this manner, a length of tape B may be fed in an accurately guided manner beneath an associated applicator arm 36 for rolling engagement by a pressure-applying roller 43. The roller 43 is rotatably carried or journaled between a pair of forwardly extending side ears 36*b* on a cross-extending shaft 42 for applying a suitable pressure on the upper or outer side of progressively advancing portions of a length of tape B to enable a smooth, aligned, non-distorting mounting of its pressure-sensitive under side on and along the panel A. The guide fender 40 may, as shown, be pivotally secured by a bolt or pin 44 on its associated arm 36** to accommodate its position to the guide path of the tape B.

Referring to FIG. 3, the shaft 27 may be provided at one end with an enlarged head **27*a* and thus entered and removed at its opposite end in its mounting with respect to the pair of secondary stands 25. Each primary, more outwardly projecting, backwardly positioned of the pair of primary stands 24 is mounted in an integral manner on unitary stand asse mbly 20 which has a lower, rail mounting slide channel 21 and the upper channel 23. The lower channel 21 is adapted to be slidably adjustably carried on an associated side rail 13 of the table 10 in a manner illustrated in FIG. 1. Threaded thumb screws 22 are employed to secure each side stand unit or assembly 20 in a desired, longitudinally adjusted position along its associated guide rail 13 by clamping engagement therewith. See also FIG. 3**.

The use of swingable applicator arms 36, the application of each of whose pressure wheel 43 is controlled by an individual spring 35, is made possible by the use of cross-extending member or bar 30 whose vertical or "in" and "out" adjusted relationship may be varied to adjust spring tension through the agency of a threaded stem 31 which extends outwardly or upwardly from an associated secondary stand 25. Each stem 31, as shown particularly in FIG. 3, may be locked in a secure, threaded relation within its stand 25. A nut **31*a* and a thumb nut 31*b* may be employed for adjusting the cross member or bar 30 to provide a desired tension loading of the springs 35 with respect to the applicator arms 36. By turning each nut 31*b* the same amount, then the same application of tension may be exerted on each spring 35 and its associated applicator arm 36. The arm in turn exerts a proportioned levered force on its end-positioned pressure roller 43**, and thus, on progressively advancing portions of an associated tape B.

It will be apparent from the construction that one or more wound, tape-carrying reels 50 may be used, depending on the number that is desired to be applied to the panel A. The particular position of each tape B on the panel is readily adjusted or changed, and the associated applicator arm 36 is also transversely adjustable so as to always be in feeding alignment at its guide end portions **40*a* and 40*b*** with respect to the associated tape B.

In FIG. 3, a hollow cross-extending shaft 45 is shown carried within a rounded half seat of the pair of primary stands 24 in a readily removable manner by a pair of strap members 46. Each strip member 46 is substantially centrally hinged at **46*a*, and has opposite tab ends which are adapted to be removably secured to the upper ends of an associated primary stand 24 by threaded set screws or bolts 47. It is thus apparent that the shaft 45 may be readily opened to insert or remove reels 50** desired.

Since each tape reel 50 is adapted to freely rotate on the shaft 45, a pair of sleeve-like limit collars or rings 48 are provided to retain as well as adjust each wheel 50 to a desired position on the shaft 45 for free rotation thereon, while pull is exerted on an associated tab B as it is being pressure-applied in a progressive-successive manner on an advancing panel A. Each collar 48 has means for securing it in an adjusted relation on the shaft 45, such as a set screw 49, see FIG. 3.

This machine enables an operator to provide any desired, reasonable number of lettering tapes B to a particular panel A by merely first inserting the requisite number of tape reels 50 on the shaft 45 at a cross-positioning thereon as set by the collars 48 that represents a desired positioning of the tape to be applied on the panel. Thereafter, each applicator arm 36 may be adjusted on its secondary shaft 27 to accurately align it with an applicable tape reel 50. The number of applicator arms 36 is to correspond to the number of reels 50. Tension of each spring 35 may then be adjusted by thumb nuts **31*b* and/or nuts 31*a*** to conform to the best setting for the particular nature of the tape B and its adhesive or pressure-sensitive coated side. For example, a more flexible or thin type of tape may be applied with a minimum of pressure, while a less flexible, thicker or stiffer tape may require a slightly greater pressure. The pressure will be proportioned so as to avoid any danger of wrinkling, folding or distorting the tape B as it is being fed, but will be sufficient to effect a pressure-adhesion of progressive portions of the tape on the panel and an automatic advance of the tape with the panel during its movement on the conveyor belt. Employing this machine, the increase in accuracy and efficiency of tape application has been greatly improved, the production rate has been materially increased, and the time involved in applying the tape has been minimized.

As shown particularly in FIGS. 2 and 3, a cross-extending guide bar or rod 28 of rounded configuration or section is adapted to be mounted by a pair of spring straps or fingers 29 on front edges of the pair of primary stands 24 in an upwardly spaced relation with respect to the side guide rails 13. The rod 28 serves to prevent side to side movement of tapes B being fed and furthers an even pulling of the tapes in their forward advancing movement. With reference to FIG. 2, it will be noted that the rod 28 is positioned in feed alignment with and is shown positioned on substantially the same vertical plane as the back sides of the reels 50, backwardly of and below the primary shaft 45, and backwardly and in a slightly off-horizontal sloped (about 15°) alignment with the applicator arms 36 and their pressure wheels 43. As shown in FIG. 1, each reel 50 may have its tape B centrally wound therein (see 51).

I claim:

1. In an apparatus for feeding and applying lettering tape and the like to a face of a substantially planar sign panel wherein a panel to which the tape is to be applied is progressively advanced on a forwardly moving table-like conveyor having a pair of opposed side rails therealong, the improvement involving a tape feed and applicating assembly mounted on the side rails and adapted to project outwardly therefrom above a sign panel being advanced forwardly on the conveyor, said assembly comprising: a pair of guide rails adapted to be mounted on the opposed side rails of the conveyor, a transversely extending primary shaft and a transversely extending secondary shaft, side-positioned stand means on said guide rails for carrying said primary shaft in a cross-extending relation therebetween and for carrying said secondary shaft in a cross-extending relation therebetween forwardly of said primary shaft, at least one feeder reel for tape having a pressure-sensitive adhesive side, said feeder reel being rotatably carried by said primary shaft, at least one applicator arm swingably carried by said secondary shaft in an aligned cooperating relation with respect to said feeder reel for guidably receiving and directing the pressure-sensitive side of a forward end portion of the tape into engagement with an outer face of the panel being advanced forwardly along the conveyor, a cross-extending member secured at its ends on said stand means between said primary and secondary shafts, spring means positioned between said applicator arm and said cross-extending member for spring-loading said arm, said applicator arm having a pressure wheel rotatably carried thereby to engage on an outer side of pressure-sensitive tape being supplied from said feeder reel to press its pressure-sensitive side upon the outer face of the advancing panel with a pressure controlled by said spring, whereby successive length portions of the tape will be applied to and advanced with the panel.

2. An apparatus as defined in claim 1 wherein the assembly comprises, a sidewise spaced-apart group of applicator arms swingably carried by said secondary shaft, a corresponding group of feeder reels rotatably carried by said primary shaft with each said reel being in alignment with a corresponding one of said applicator arms, individual spring means positioned between each of said applicator arms and said cross-extending member for spring-loading each of said arms, each of said arms having a pressure wheel rotatably carried thereby and adapted to guidably engage and apply tape from an associated reel upon the outer face of the panel during its advancing movement and to thereby cause successive portions of each tape to advance in pressure engagement with the panel.

3. An apparatus as defined in claim 2 wherein means cooperates with said cross-extending member to adjust the force application of said spring means to said applicator arms.

4. An apparatus as defined in claim 1 wherein means adjustably mounts said cross-extending member with respect to said pair of stand means and is adapted to adjust the tension of said spring means and thus the pressure application of said pressure wheel to the tape.

5. An apparatus as defined in claim 1 wherein, said applicator arm is at one end swingably carried on said secondary shaft to project backwardly from said cross-extending member, said pressure wheel is carried by said applicator wheel adjacent its forward end, and a guide fender extends from said arm over said pressure wheel to receive and guide the tape being supplied from said feeder reel to the outer face of the advancing panel.

6. An apparatus as defined in claim 5 wherein said guide fender has a centrally disposed inclined guide lip for movement of the tape therealong and a pair of side-positioned guide fingers that define a guide slot therebetween for the tape.

7. An apparatus as defined in claim 1 wherein, said stand means comprises a pair of side stands for each of said shafts, and said pair of guide rails have means for securing them in a longitudinally adjustable relation on the pair of opposed side rails of the conveyor.

8. An apparatus as defined in claim 7 wherein, each said side pair of stands is carried on a side channel and each said side channel is adapted to be slidably positioned on an associated side rail of the conveyor, and means cooperates with each said side channel and the associated side rail for securing each said channel in an adjusted relation with respect to the associated side rail.

9. An apparatus as defined in claim 1 wherein, a guide rod extends across between said stand means in a spaced position below said primary shaft in substantial planar vertical alignment with a back side of said feeder reel and in an upwardly spaced tape-guiding position backwardly of said pressure wheel, and a guide fender is carried by said applicator arm to guide the tape from said rod to said pressure wheel.

10. An apparatus as defined in claim 9 wherein, said guide fender has a pair of spaced-apart guide fingers, and means pivotally mounts said guide fender on said applicator arm for aligning said guide fingers with tape being fed from said feeder reel.

11. An apparatus as defined in claim 2 wherein, a guide rod is positioned to extend across between said stand means in a spaced position below said primary shaft and in a slightly off-horizontal angular position with respect to and above said pressure wheels, and said rod is adapted to guide the tape from said feeder reels to said pressure wheels.

12. An apparatus as defined in claim 11 wherein, a guide fender extends backwardly from each of said applicator arms, each said fender has a pair of side-positioned guide fingers and a centrally disposed lip, and each said fender is pivotally mounted on its associated said applicator arm to accommodate alignment of said pair of guide fingers and said lip with tape being fed to said pressure wheels.

13. In an apparatus for feeding and applying pressure-sensitive lettering tape or the like to an outer face of a substantially planar sign panel wherein a panel to which tape is to be applied is progressively advanced on a forwardly moving table-like conveyor having a pair of opposed side rails therealong, the improvement involving a tape feed and applicating assembly mounted on the side rails and adapted to project outwardly therefrom above a sign panel being advanced forwardly on the conveyor, said assembly comprising: a pair of guide rails adapted to be mounted on the opposed side rails of the conveyor, a pair of primary side stands integrally secured on said guide rails, a pair of forwardly spaced secondary side stands adjustably positioned with respect to said primary side stands on said guide rails, a transversely extending primary shaft carried by said pair of primary stands and a transversely extending secondary shaft carried by said pair of secondary stands, at least one feeder reel for tape having a pressure-sensitive side, said feeder reel being rotatably carried by said primary shaft, at least one applicator arm swingably carried by said secondary shaft in an aligned cooperating relation with respect to said feeder reel, a cross-extending member secured at its ends between said pair of secondary stands forwardly of said secondary shaft and rearwardly of said primary shaft, means for mounting opposite ends of said cross-extending member on said pair of secondary stands in an adjustable relation with respect thereto, spring means positioned between said applicator arm and said cross-extending member for spring-loading said applicator arm, said means for mounting said cross-extending member being adapted to adjust the tension of said spring means, said applicator arm having a pressure wheel rotatably carried adjacent one end thereof and adapted to engage an outer side of the tape supplied from said feeder reel to press its pressure-sensitive side upon an outer face of the advancing panel with a pressure controlled by said spring, whereby successive portions of the tape will be applied to and advanced with the panel.

14. An apparatus as defined in claim 13 wherein, a group of spaced-apart said feeder reels is rotatably carried by said primary shaft in a sidewise spaced-apart relation thereon, a group of applicator arms of the defined construction is swingably carried by said secondary shaft in an aligned relation with respect to an associated one of said reels for receiving tape supplied thereby, each of said applicator arms has spring means positioned between it and said cross-extending member for spring-loading each said arm, and said applicator arms are in spaced-apart cross-positioned alignment with respect to each other for simultaneously pressure-applying tape from said group of reels to the outer face of the panel for progressive advancement therewith.

15. An apparatus as defined in claim 13 wherein, a fender element is carried by said applicator arm to project over said pressure wheel, and said fender element has a slotted portion for guiding the tape in alignment with said wheel.

* * * * *